United States Patent

[11] 3,557,892

| [72] | Inventor | Donald E. Burrough<br>Ottumwa, Iowa |
|---|---|---|
| [21] | Appl. No. | 821,348 |
| [22] | Filed | May 2, 1969 |
| [45] | Patented | Jan. 26, 1971 |
| [73] | Assignee | Deere & Company<br>Moline, Ill.<br>a corporation of Delaware |

[54] HITCH ADAPTER
9 Claims, 4 Drawing Figs.

[52] U.S. Cl.................................................. 180/14
[51] Int. Cl..................................................... B60d 1/00
[50] Field of Search............................................. 180/14,
(ABCDG), 14.5, 51; 280/420, 482, 485; 64/21

[56] References Cited
UNITED STATES PATENTS
| 1,889,600 | 11/1932 | Hansen........................ | 180/14 |
| 2,696,089 | 12/1954 | Heth............................ | 180/14 |
| 3,311,185 | 3/1967 | Duncan et al................ | 180/14 |

Primary Examiner—Leo Friaglia
Assistant Examiner—Robert R. Song
Attorneys—H. Vincent Harsha, Harold M. Knoth, William A. Murray and John M. Nolan

ABSTRACT: An agricultural tractor has a drawbar with a vertical pin and a rearward PTO shaft a predetermined distance forward of the drawbar pin. A trailing PTO-driven implement has a fore-and-aft tongue and an input drive shaft connected to the tractor PTO shaft through a telescoping drive assembly, which includes front and rear universal joints. The implement tongue is connected to the drawbar through a hitch adapter which provides articulation between the tractor and the implement about a vertical axis rearwardly of the vertical drawbar pin, so that the vertical axis of articulation is equidistant from the two universal joints, providing constant speed in the implement drive shaft regardless of the degree of articulation between the tractor and implement.

INVENTOR.
D. E. BURROUGH

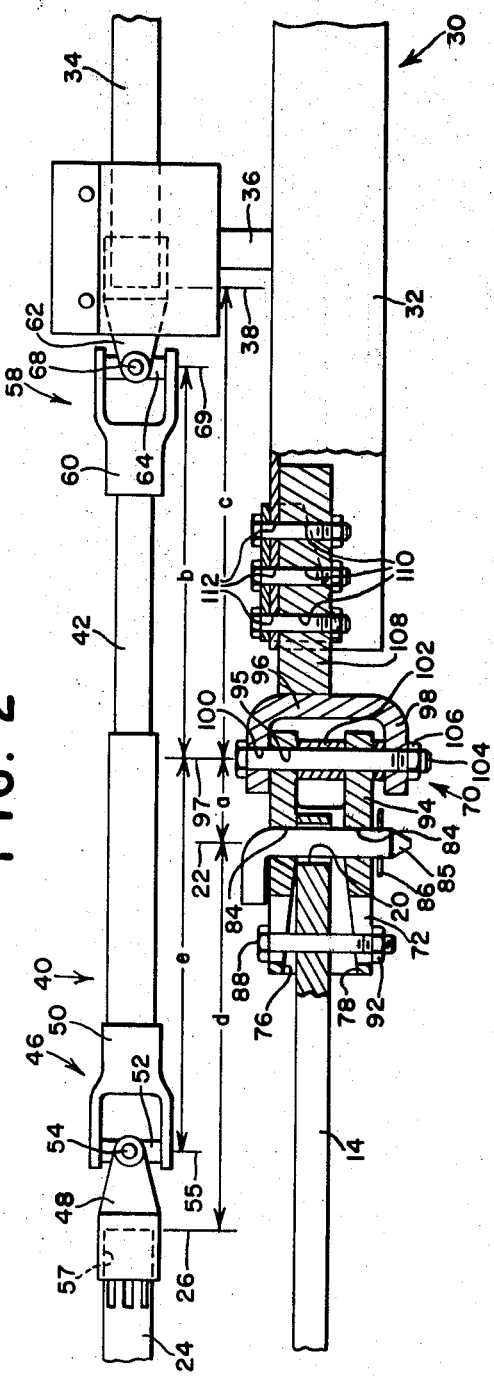

HITCH ADAPTER

BACKGROUND OF THE INVENTION

Modern tractors conventionally have a rearwardly extending drawbar and a rearward PTO output shaft above the drawbar. The drawbar is conventionally connected to the tongue of a trailing implement through a vertical pin, which permits the implement to articulate relative to the tractor about a vertical axis. The amount of rearward extension of the drawbar is limited, since the greater the distance from the point of connection with the implement and the supporting structure for the drawbar on the tractor, the greater the moment arm for the vertical loads imposed on the drawbar by the implement. If the rearward extension of the drawbar is too great, the vertical loads on the drawbar will counterbalance too much of the weight on the front end of the tractor, necessitating larger front end weights on the tractor, and also create relatively large stresses in the drawbar supporting structure. Accordingly, it has become standard in the industry to provide a distance of 16 inches from the end of the PTO shaft to the vertical pivot axis on the drawbar in the case of a 1,000 r.p.m. PTO shaft, and to provide a distance of 14 inches between the vertical pivot axis on the drawbar and the end of the PTO shaft in the case of a 540 r.p.m. PTO shaft.

The rearward PTO shaft is conventionally connected to the input drive shaft on the trailing PTO-driven implement through a drive line assembly, which includes an internally splined socket at its forward end engageable with the externally splined PTO shaft, a similar internally splined socket at its rearward end engageable with the implement input shaft, front and rear universal joints immediately adjacent the respective internally splined sockets, and a telescoping drive shaft connecting the two universal joints. As the implement articulates relative to the tractor about the vertical drawbar pivot, such as when the tractor and trailing implement combination are rounding a corner, the drive line articulates about the two universal joints while the drive shaft between the universal joints telescopes. For example, when the tractor drawbar and trailing implement tongue form a 90° angle, such as when the machinery is operated around a sharp corner, the two universal joints together articulate a total of 90°, the foreshortened drive shaft between the universal joints forming the hypotenuse of a triangle, the legs which are formed by the tractor drawbar and the implement tongue. There is also some degree of telescoping when the tractor and implement move over a sharp rise or through a ditch, causing the implement to oscillate relative to the drawbar about a transverse horizontal axis.

Two sizes of universal joints are widely used today in the drive line assemblies, namely the 3,200 and 10,000 inch-pound series joints. The smaller joint requires an overall drive line assembly length of at least 34 inches to provide sufficient telescoping of the shaft portions so that the two shaft portions do not pull apart or bottom out during maximum articulation of the tractor and implement, while the larger joint requires an overall length of at least 35½ inches.

Since, in the case of the 540 r.p.m. PTO, only 14 inches is provided between the end of the PTO shaft and the pivot at the end of the drawbar, at least 21½ inches are needed between the forward end of the implement input shaft and the drawbar pivot to obtain the necessary total distance of 35½ inches between the end of the PTO shaft and the end of the implement shaft required by the larger drive line assembly. Since the distance between the vertical axis of articulation and the end of the implement input shaft is substantially greater than the distance between the axis of articulation and the end of the PTO shaft, when articulation occurs the angle at the front universal joint is substantially different than the angle at the rear universal joint. This, of course, produces a speed fluctuation in the implement drive shaft during every revolution of the drive shaft, even though the PTO shaft speed is constant. The resulting speed variations in the implement drive, are, of course, highly undesirable and produce wear and excessive vibration in the implement drive system. With only a slight degree of articulation, the difference in the front and rear universal joint angles is relatively small, so that the speed variation in the implement drive line is not severe. However, at a relatively large degree of articulation, such as when the tractor and implement are making a sharp corner, the difference in the universal joint angles is substantial, producing a severe speed fluctuation in the implement drive line, which could lead to the destruction of the implement drive system if it occurred over a sustained period.

The above problem could be solved by using constant-speed-type universal joints in the drive line, although to provide presently available constant-speed universal joints of a necessary durability and strength would be excessively expensive, greatly increasing the cost of the implement drive system.

SUMMARY OF THE INVENTION

According to the present invention, an adapter is provided for connecting the implement tongue to the tractor drawbar, whereby the axis of articulation is provided equidistantly between the end of the PTO shaft and the end of the implement input drive shaft, providing equiangular articulation at the front and rear universal joints in the drive line connecting assembly and thereby providing constant speed in the implement drive line regardless of the angle of articulation between the tractor and implement.

An important feature of the hitch adapter resides in the fact that the above equiangular geometry is achieved without affecting the vertical loading on the tractor drawbar. Another important feature of the invention resides in the provision of means for adjusting the hitch adapter to provide the equiangular drive line universal joint geometry for either a 540 or 1,000 r.p.m. PTO speed. Still another feature of the invention resides in the provision of means on the hitch adapter for accommodating different drawbar widths.

BRIEF DESCRIPTION OF THE DRAWINGS

FIG. 2 is a side elevation view of a 540 r.p.m. tractor PTO and its associated drawbar respectively connected to the implement drive shaft and tongue, the hitch adapter connecting the drawbar to the tongue being shown in section.

FIG. 3 is a view similar to FIG. 2, but showing a 1,000 r.p.m. PTO drive system and showing the hitch adapter in full.

DESCRIPTION OF THE PREFERRED EMBODIMENT

Figure 1:
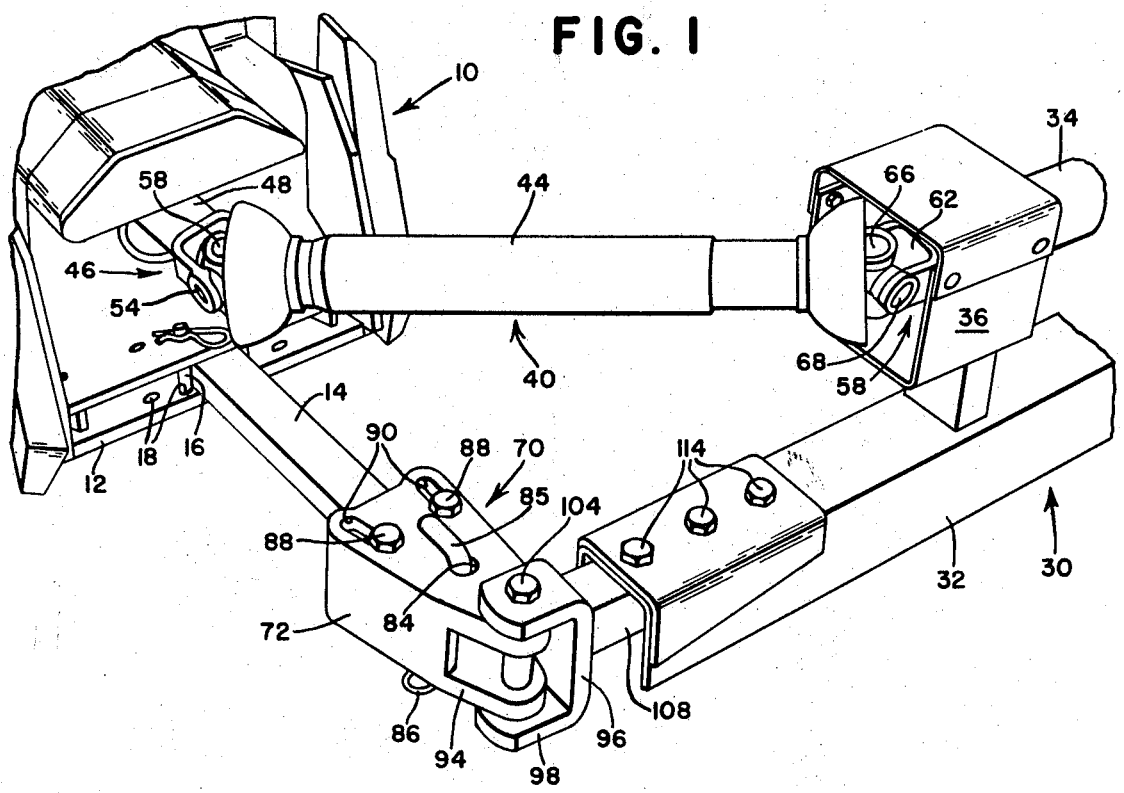
FIG. 1 is a perspective view of the rear end of a tractor and a front end of a trailing implement, which is articulated relative to the tractor and connected to the tractor drawbar by means of the hitch adapter.
Figure 4:
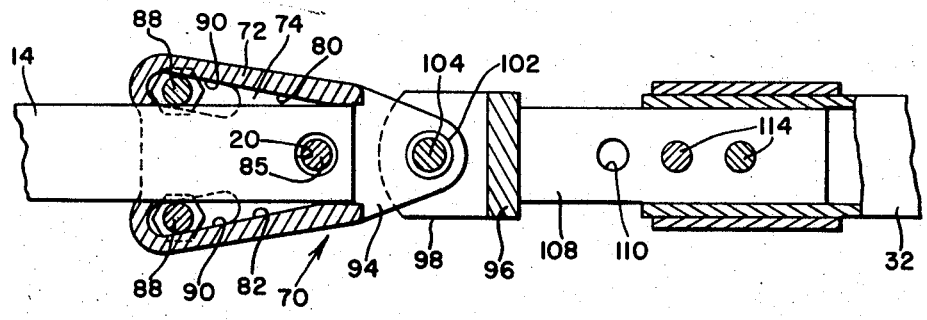
FIG. 4 is an enlarged sectional plan view of the hitch adapter, as viewed along the line 4—4 in FIG. 3.

The invention is embodied in a tractor-trailing vehicle combination, only the rearward portion of the tractor being shown in FIG. 1 and indicated generally by the numeral 10. The tractor includes a rearward drawbar supporting structure 12 on which a rearwardly projecting drawbar 14 is mounted. As is conventional, the drawbar 14 is laterally adjustable and locked in a selected position by removable pins 16 insertable through alternate holes 18 in the drawbar supporting structure. The drawbar 14 has a vertical pivot bore 20 adjacent its rearward end, the axis of the vertical bore 20 being indicated by the numeral 22.

The tractor has a rearwardly extending PTO shaft, which is identified by the numeral 24 in the case of a 540 r.p.m. PTO output (FIG. 2) and the numeral 24' in the case of the 1,000 r.p.m. PTO shaft (FIG. 3). The dimension lines 26 and 26' respectively locate the ends of the 540 and 1,000 r.p.m. PTO shafts 24 and 24'. As is well known to those skilled in the agricultural tractor and implement art, the standard distance between the axis 22 of the drawbar pivot bore and the end of the PTO shaft is 14 inches in the case of the 540 r.p.m. shaft and 16 inches in the case of the 1,000 r.p.m. shaft, the respective distances being identified by the letters *d* and *d'* in FIGS. 2 and 3.

A trailing implement, indicated generally by the numeral 30, is towed by the tractor and powered through the tractor PTO shaft, only the forward portion of the implement 30 being shown in the drawings. The implement 30 could be any one of numerous different types of PTO-driven agricultural machines, such as a mower-conditioner, a baler, a forage harvester, a combine, a manure spreader, or any similar implement. The illustrated implement, as is conventional, has a forwardly extending tongue or draft member 32 and an implement drive shaft or input shaft 34 above and generally parallel to the tongue 32, the forward end of the drive shaft 34 being rotatably supported above the tongue by means of a shielded journal and supporting structure 36. The forward end of the drive shaft 34 is delineated by the line 38 in FIGS. 2 and 3.

The drive shaft 34 is connected to and driven by the tractor PTO shaft 24 or 24' by a power shaft or tractor hookup assembly, indicated generally by the numeral 40. The power shaft assembly includes a central telescoping section 42, which is covered by a telescoping shield 44, shown only in FIG. 1. At the forward end of the shaft 42 is a front universal joint 46, including a front yoke 48 and a rear yoke 50, which are respectively pivotally connected to a spider 52 by universal joint pivots 54 and 56. The drive line articulates about the point of intersection of the axes of the pivots 54 and 56, the location of which is indicated by the dimension line 55. The above, of course, represents more or less conventional universal joint construction. The front yoke 48 has an internally splined axial bore 57 adapted to receive the 540 r.p.m. PTO shaft 24, or alternately, an internally splined bore 57' adapted to receive the 1,000 r.p.m. PTO shaft 24', the alternate internal splines being conventionally provided for the different PTO speeds since the industry standards require different external splines on the 540 and 1,000 r.p.m. PTO shafts to eliminate the possibility of hooking up a 540 r.p.m. implement to a 1,000 r.p.m. PTO shaft, or vice versa.

The rear end of the telescoping shaft 42 is connected to the forward end of the implement drive shaft 34 through a rear U-joint 58, which includes front and rear yokes 60 and 62 respectively pivotally connected to a spider 64 via universal joint pivots 66 and 68. The point of articulation of the rear universal joint is located by the dimension line 69. The rear yoke 62, like the front yoke 48 of the front U-joint 46, is internally splined to receive the forward end of the implement drive shaft 34. The distance between the ends of the PTO shafts at 26 and 26' and the point of articulation of the front universal joint is equal to the distance between the front end of the implement drive shaft at 38 and the point of articulation of the rear universal joint.

The size of the universal joints dictates the minimum length of the entire power shaft assembly, since the telescoping shaft section 42 must have a certain length so that the shaft will not bottom out during sharp turns or pull apart when the implement is pulled over a sharp rise in the ground, the larger universal joints, of course, requiring a greater overall length for the power shaft assembly. As previously indicated, two commonly used universal joints respectively require 34 and 35½ inches between the end of the PTO shaft and the front end of the implement drive shaft to provide sufficient length in the telescoping shaft section 42.

The front end of the implement tongue 32 is connected to the rear end of the tractor drawbar 14 by a hitch adapter, indicated generally by the numeral 70. The adapter 70 includes a front number 72, which includes a forwardly opening socket 74 having rearwardly converging top and bottom walls 76 and 78 and rearwardly converging sidewalls 80 and 82, the space between the top and bottom walls 76 and 78 being substantially greater than the vertical dimension of the drawbar 14, while the spacing between the converging sidewalls 80 and 82 at the rearward end of the socket is at least wide enough to accommodate most conventional tractor drawbars, the illustrated drawbar 14 being of maximum conventional width and substantially spanning the distance between the socket sidewalls at their rearward end of the socket. A vertical bore 84 extends through the top and bottom walls of the socket and when the drawbar 14 is properly positioned within the socket 74, the bore 84 is aligned with the vertical bore 20 in the drawbar. An L-shaped hitch pin 85 is insertable through the vertically aligned bores 84 and 20 to lock the front adapter member 72 to the drawbar, the hitch pin being provided with a conventional lock 86 at its lower extremity to prevent inadvertent removal of the pin.

The member 72 is prevented from laterally swinging about the axis 22 of the vertically aligned bores relative to the drawbar 14 by a pair of vertically extending bolts 88 engageable with opposite sides of the drawbar rearwardly of the hitch pin 85, the bolts 88 respectively being insertable through inwardly and rearwardly converging slotlike apertures 90 on opposite sides of the sockets 74. The inwardly converging apertures 90 extend through both the top and bottom walls, and the bolts 88 extend through the entire front member 72 and are locked therein by nuts 92. As is apparent, the effective width of the socket 74 at its rearward end can be decreased by loosening the nuts 92 and sliding the bolts 88 rearwardly, whereby the front member 72 can be locked against lateral swinging relative to the drawbar 14 despite minor variations in the width of the drawbar.

The front member 72 has a rearwardly extending clevis 94, the upper and lower arms of which have vertically aligned bores 95. The axis of the bores 95 is delineated by the line 97 in FIGS. 2 and 3 and in the preferred embodiment, the distance, *a*, between the axis 97 and the axis 22, is 3¾ inches.

The adapter 70 also includes a rear member 96 having a forwardly extending clevis 98, the upper and lower arms of which are respectively above and below the arms of the clevis 94 and are provided with vertically aligned bores 100 coaxial with the bores 95. A sleevelike spacer 102 is coaxially provided between the upper and lower arms of the clevis 94 and the front clevis 94 and the rear clevis 98 are pivotally connected by a boltlike vertical pin 104 extending downwardly through the aligned bores 95 and 100 and locked therein by a nut 106. Thus, the rear member 96 is free to swing relative to the front member 72 about the axis 97.

The rear member 96 has a rearwardly extending shank portion 108, which is provided with three vertical bores 110 which are spaced in a fore-and-aft direction at 2 inch intervals. The forward end of the implement tongue 32 is provided with three corresponding bores 112 and the rear adapter member 96 is removably attached to the front end of the implement tongue by bolt-and-nut-type fasteners 114 insertable through the vertically aligned bores 110 and 112.

When all three bores 110 are aligned with the three bores 112, the distance between the pivot axis 97 and the end of the implement drive shaft, as indicated by the line 38, is 17¾ inches in the illustrated embodiment. This distance is illustrated by the dimension *c* in FIG. 2. However, the above distance can be increased by 2 inches to 19¾ inches, as indicated by the dimension *c'* in FIG. 3, by removing the fasteners 114 and sliding the rear adapter member 96 forwardly relative to the implement tongue, so that only the rearward two bores 110 in the adapter member line up with the forward two bores 112 in the implement tongue and again securing the adapter member to the implement tongue using two fasteners 114 through the aligned bores.

In operation, when the implement drive system is arranged for 540 r.p.m. operation, the rear adapter member 96 is positioned in its retracted position, as shown in FIG. 2, wherein the vertical pivot axis 97 is 17¾ inches forwardly of the front end of the implement drive shaft 34. The implement is then connected to a tractor arranged for 540 r.p.m. PTO output by connecting the front adapter member 72 to the tractor drawbar 14. The connection is accomplished by inserting the drawbar into the socket 74 in the front adapter member 72 until the bores 84 in the member 72 are in vertical alignement with the bore 20 in the drawbar. The hitch pin 85 is then inserted through the aligned bores, locking the front adapter member 72 to the drawbar. As previously described, the bolts 88 are moved rearwardly along the slotted apertures 90 until they tightly engage the opposite sides of the drawbar 14, at which time they are clamped via the nuts 92, whereby the front adapter member 72 is prevented from swinging laterally relative to the drawbar.

The implement drive shaft 34 is then connected to the tractor PTO shaft 24 through the power shaft assembly 40, the rearward universal joint 58 of which is splined to the front end of the shaft 34, and the forward universal joint 46 of which is splined to the PTO shaft 24, conventional locking devices being provided to secure the front and rear universal joints to the respective shafts.

The tractor-implement combination is now set for operation. When the tractor turns relative to the implement, the implement will articulate relative to the tractor about the axis 97 of the pivot pin 104 connecting the front and rear adapter members 72 and 96. As previously described, the axis 97 is 3¾ inches to the rear of the axis 22 of the drawbar bore 20, which in turn is 14 inches to the rear of the rear end of the PTO shaft 24. Thus, the total distance from the axis of articulation 97 to the end of the PTO shaft is 17¾ inches, the same as the distance between the axis of articulation and the front end of the implement drive shaft 34. Since the distances between the points of articulation of the universal joints and the ends of the respective shafts are equal, the distances $e$ and $b$ between the axis of articulation 97 and the points of universal joint articulation 55 and 69 is also equal. Thus, when the implement articulates relative to the tractor, the front and rear universal joints are equidistant from the ends of the respective shafts, and the front and rear universal joints 46 and 58 will articulate at equal angles, producing a constant speed in the implement drive shaft 34. The total distance between the rear of the tractor PTO shaft and the front end of the implement drive shaft is, of course, 35½ inches, which, as previously described, is the total distance required to provide sufficient telescoping of the shaft section 42 when the larger universal joints are utilized. Obviously, the above distance is more than adequate to permit sufficient telescoping when the smaller universal joints are utilized.

Although the axis of articulation is, in effect, moved rearwardly of the drawbar, the vertical loading on the drawbar is not increased. As is apparent, the front and rear adapter members 72 and 96 articulate relative to one another only about the vertical axis 97, and for the purposes of oscillation about a transverse horizontal axis, the hitch adapter 70 functions as a forward extension of the implement tongue 32. The vertical distance between the top and bottom walls 76 and 78 of the socket 74 is greater than the vertical dimension of the drawbar 14 and the drawbar bore 20 is somewhat larger than the diameter of the pin 85, so that oscillation about a transverse axis occurs at the bore 20. Thus, insofar as vertical loading of the drawbar is concerned, the effective length of the drawbar 14 is not increased.

When the implement drive is arranged for 1,000 r.p.m. operation, the rear hitch adapter member 96 is moved forwardly to the position shown in FIG. 3, so that the distance $c'$ between the forward end of the implement drive shaft 34 and the axis of articulation 97 is 19¾ inches. Since the distance $d'$ between the end of the 1,000 r.p.m. PTO shaft 24' and the axis 22 is 16 inches, and the distance between the drawbar bore axis 22 and the axis of articulation 97 is still 3¾ inches, the total distance between the end of the PTO shaft 24' and the axis of articulation 97 is 19¾ inches, which is equal to the 19¾ inch distance between the end of the implement drive shaft and the axis of articulation. Thus, the distance $e'$ equals the distance $b'$, again providing equiangular geometry in the front and rear universal joints 46 and 58 to produce constant speed in the implement drive shaft 34.

I claim:

1. In a tractor-trailing vehicle combination wherein the tractor includes a rearwardly extending drawbar with a vertical pivot element and a rearwardly extending PTO output shaft forwardly of the drawbar vertical pivot element axis and the implement includes a tongue and an input drive shaft connected to and driven by the tractor PTO shaft through a power transmitting assembly including a forward universal joint having a point at which the drive line articulates forwardly of the axis of the drawbar vertical pivot element and a rearward universal joint having a point at which the drive line articulates rearwardly of the drawbar vertical pivot element, the improvement comprising: a first hitch adapter member; means connecting the first hitch adapter member to the rearward end of the tractor drawbar; a second hitch adapter member; means connecting the second hitch adapter member to the forward end of the implement tongue; and vertical pivot means operatively interconnecting the first and second hitch adapter members for transmitting a draft force from the tractor drawbar to the implement tongue while permitting the tongue to articulate relative to the drawbar about the vertical axis of the pivot means, the vertical axis of the pivot means being disposed rearwardly of the axis of the drawbar vertical pivot element and substantially equidistant from the respective points of drive line articulation of the forward and rearward universal joints.

2. The invention defined in claim 1 wherein the means connecting the first hitch adapter means to the tractor drawbar includes means adapted to permit limited vertical articulation of the first hitch adapter means relative to the drawbar about a transverse horizontal axis.

3. The invention defined in claim 2 wherein the means connecting the first hitch adapter member to the drawbar includes socket means in the first hitch adapter member adapted to receive the tractor drawbar and having a greater vertical dimension than the drawbar received therein to permit vertical oscillation of the adapter member relative to the drawbar.

4. The invention defined in claim 3 and including adjustment means associated with the socket means to vary the effective width of the socket means to accommodate different drawbar widths.

5. The invention defined in claim 1 wherein the vertical drawbar pivot element comprises a first vertical bore in the drawbar and the first hitch adapter means includes a second vertical bore means alignable with the vertical bore in the drawbar and the means connecting the first hitch adapter member to the drawbar includes a first vertical pin insertable through the first and second vertical bore means.

6. The invention defined in claim 1 wherein the vertical pivot means connecting the first and second hitch adapter member includes third and fourth vertically alignable bore means respectively through the first and second adapter members and a second vertical pin rotatable and coaxially mounted in third and fourth vertical bore means.

7. The invention defined in claim 1 wherein the means connecting the second hitch adapter member to the implement tongue includes adjusting means for selectively varying the distance from the vertical pivot means to the point of drive line articulation of the rearward universal joint to accommodate changes in the distance from the vertical pivot means to the point of drive line articulation of the forward universal joint.

8. The invention defined in claim 5 wherein the vertical pivot means connecting the first and second hitch adapter members includes third and fourth vertically alignable bore means respectively through the first and second adapter members and a second vertical pin rotatable and coaxially mounted in the third and fourth vertical bore means.

9. The invention defined in claim 8 wherein the means connecting the second hitch adapter member to the implement tongue includes adjusting means for selectively varying the distance from the vertical pivot means to the point of drive line articulation of the rearward universal joint.